United States Patent
He et al.

(10) Patent No.: US 10,809,073 B2
(45) Date of Patent: Oct. 20, 2020

(54) LOCAL WINDOW-BASED 2D OCCUPANCY GRIDS FOR LOCALIZATION OF AUTONOMOUS VEHICLES

(71) Applicant: HERE Global B.V., Eindhoven (NL)

(72) Inventors: Fangning He, Chicago, IL (US); David Doria, Oak Park, IL (US); Xin Chen, Evanston, IL (US); Charles Morcom, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/210,553

(22) Filed: Dec. 5, 2018

(65) Prior Publication Data

US 2020/0182626 A1 Jun. 11, 2020

(51) Int. Cl.
*G01C 21/32* (2006.01)
*G06F 16/29* (2019.01)
(Continued)

(52) U.S. Cl.
CPC .............. *G01C 21/32* (2013.01); *G06F 16/29* (2019.01); *G06K 9/00798* (2013.01); *G06T 7/11* (2017.01);
(Continued)

(58) Field of Classification Search
CPC .... G01C 21/32; G06K 9/00798; G06F 16/29; G06T 7/73; G06T 7/11; G06T 2207/30252; G06T 2207/30244
See application file for complete search history.

(56) References Cited

U.S. PATENT DOCUMENTS 8,798,840 B2 * 8/2014 Fong .................... G05D 1/0274
701/23
8,825,391 B1 * 9/2014 Urmson ................. G01C 21/32
701/448
(Continued)

FOREIGN PATENT DOCUMENTS

JP 2017157087 A 9/2017
WO WO2018038257 A1 3/2018

OTHER PUBLICATIONS

Kim, Soohwan, and Jonghyuk Kim. "Continuous occupancy maps using overlapping local gaussian processes." Intelligent Robots and Systems (IROS), 2013 IEEE/RSJ International Conference on. IEEE, 2013.
(Continued)

*Primary Examiner* — Tyler J Lee
(74) *Attorney, Agent, or Firm* — Lempia Summerfield Katz LLC

(57) ABSTRACT

Embodiments include apparatus and methods for automatic generation of local window-based 2D occupancy grids that represent roadside objects at a region of a roadway and automatic localization based on the 2D occupancy grids. 2D occupancy grids are generated based on an altitude threshold for point cloud data and grid cell occupancy for grid cells of local windows associated with the region of the roadway. The 2D occupancy grids are stored in a database and associated with the region of the roadway. Sensor data from a user located at the region of the roadway is received. The accessed 2D occupancy grids and the received sensor data are compared. Based on the comparison, localization of the user located at the region of the roadway is performed.

19 Claims, 13 Drawing Sheets

(51) Int. Cl.
*G06T 7/73* (2017.01)
*G06K 9/00* (2006.01)
*G06T 7/11* (2017.01)

(52) U.S. Cl.
CPC ...... *G06T 7/73* (2017.01); *G06T 2207/30244* (2013.01); *G06T 2207/30252* (2013.01)

(56) References Cited

U.S. PATENT DOCUMENTS

| | | | |
|---|---|---|---|
| 9,285,805 B1 | 3/2016 | Pollock | |
| 10,354,154 B2* | 7/2019 | Westerhoff | G06T 7/97 |
| 2009/0048782 A1* | 2/2009 | Chang | G06T 17/00 |
| | | | 702/5 |
| 2009/0055096 A1* | 2/2009 | Chang | G01B 11/2518 |
| | | | 702/5 |
| 2014/0005933 A1* | 1/2014 | Fong | G05D 1/0274 |
| | | | 701/447 |
| 2016/0232412 A1 | 8/2016 | Nishijima | |
| 2016/0282867 A1* | 9/2016 | Yamamura | A01D 34/008 |
| 2018/0058861 A1 | 3/2018 | Doria | |
| 2018/0143647 A1* | 5/2018 | Wang | G01S 13/86 |
| 2018/0225968 A1* | 8/2018 | Wang | G08G 1/13 |
| 2018/0300560 A1* | 10/2018 | Westerhoff | G06K 9/00791 |
| 2018/0339710 A1* | 11/2018 | Hashimoto | B60W 40/04 |
| 2019/0129441 A1* | 5/2019 | Agarwal | G06F 9/30181 |
| 2019/0139403 A1* | 5/2019 | Alam | G01C 21/32 |
| 2019/0236381 A1* | 8/2019 | Rochan Meganathan | |
| | | | G01S 17/89 |
| 2019/0384309 A1* | 12/2019 | Silva | G01S 17/931 |

OTHER PUBLICATIONS

European Search Report for European Patent Application No. 19213497.1-1206 dated Apr. 20, 2020.

* cited by examiner

LOCAL WINDOW-BASED 2D OCCUPANCY GRIDS FOR LOCALIZATION OF AUTONOMOUS VEHICLES

FIELD

The following disclosure relates to generation of 2D occupancy grids of a vicinity of a roadway that represent roadside objects at the vicinity of the roadway, and in addition, applications for localization at the vicinity of the roadway based on the generated 2D occupancy grids.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The GPS system is maintained and made available by the United States government. Originally, the government retained exclusive use of GPS. Over time increasing levels of accuracy of the GPS signals were made available to the public.

Accuracy of the GPS system alone is about 50 feet or 15 meters. The accuracy may be augmented using secondary techniques or systems such as the Wide Area Augmentation System (WAAS), Differential GPS (DGPS), inertial navigation systems (INS) and Assisted GPS. WAAS and DGPS improve accuracy using ground stations that transmit position information. INS utilizes internal sensors at the receiving device for improving the accuracy of GPS.

However, some applications require greater accuracies than obtainable with GPS, even with enhanced accuracy techniques. For example, in HD mapping and navigating applications, the receiving device may be placed on a map in a three-dimensional view with greater accuracy than that obtainable from GPS techniques. Localization techniques that match a location to a map or environment face additional challenges in improving this accuracy.

Modern vehicles require accurate navigational systems. A vehicle may eliminate many dangerous unknowns by identifying exactly where the vehicle is on the road in real time, along with its immediate surroundings (i.e., localization). A high definition (HD) map may be a crucial component of assisted or automatic driving technology. Vehicles may include many sensors, but an HD map may be the most important tool vehicles use.

Sensors in vehicles may be able to detect lanes and lane markings in real time using image processing and light detection and ranging (LiDAR) based systems. These systems are useful for obstacle avoidance and detecting the movements of other vehicles. When used alone though, on-board sensor systems may exhibit large blind spots and may be unable to predict events or maneuvers even a short distance away.

On-board sensors, however, when combined with HD maps may allow for assisted and highly automated vehicle operation. HD maps may allow a vehicle to identify precisely where it is with respect to the road (or the world) far beyond what the GPS can do, and without inherent GPS errors. The HD map allows the vehicle to plan precisely where the vehicle may go, and to accurately execute the plan because the vehicle is following the map. By identifying precisely where a vehicle is on the road to the decimeter or even centimeter, and understanding the surroundings, a mapping platform may bring advanced safety to an ever-changing environment.

To take advantage of HD maps for localization techniques, vehicles must sense their environment and match what they see to an HD map. Localization relies on pertinent structures in the world being present in these HD maps. There is a need for better mapping for connected cars, with more exact localization positioning technology and cloud connectivity that will help provide an even safer drive.

SUMMARY

In one embodiment, a method is provided for generating a local window-based two-dimensional (2D) occupancy grid that provides a signature for a location along a region of a roadway including identifying, by a processor, a set of local windows associated with the region of a roadway, the local windows comprising a plurality of grid cells, receiving, by the processor, point cloud data for the region of the roadway, assigning, by the processor, the point cloud data to corresponding grid cells within the set of local windows based on a predetermined altitude range, determining, by the processor, a grid cell occupancy for the grid cells within the set of local windows based on a predetermined threshold of point cloud data assigned to corresponding grid cells, and generating, by the processor, a 2D occupancy grid as the signature for the location along the region of the roadway, the 2D occupancy grid being generated for a window of the set of local windows based on the determined grid cell occupancy for the grid cells within the window.

In another embodiment, an apparatus is provided for generating a local window-based two-dimensional (2D) occupancy grid that provides a signature for a location along a region of a roadway. The apparatus includes a communication interface and a controller. The communication interface is configured to receive point cloud data associated with the region of a roadway. The controller is configured to identify a set of local windows associated with the region of a roadway, the local windows comprising a plurality of grid cells, assign the point cloud data to corresponding grid cells within the set of local windows based on a predetermined altitude range, determine a grid cell occupancy for the grid cells within the set of local windows based on a predetermined threshold of point cloud data assigned to corresponding grid cells, and generate a 2D occupancy grid as the signature for the location along the region of the roadway, the 2D occupancy grid being generated for a window of the set of local windows based on the determined grid cell occupancy for the grid cells within the window.

In another embodiment, a non-transitory computer-readable medium includes instructs for a processor to perform identifying, based on a location of a user at a region of a roadway, a local window associated with the region of the roadway, accessing a 2D occupancy grid associated with the local window, wherein the 2D occupancy grid represents roadside objects at the region of the roadway, and wherein the 2D occupancy grid is generated based on a predetermined threshold of point cloud data assigned to corresponding grid cells within the 2D occupancy grid, receiving sensor data from the user located at the region of the roadway, comparing the 2D occupancy grid and the received sensor data, and performing localization of the user located at the region of the roadway based on the comparison.

BRIEF DESCRIPTION OF THE DRAWINGS

Exemplary embodiments of the present invention are described herein with reference to the following drawings.

DETAILED DESCRIPTION

Figure 1:
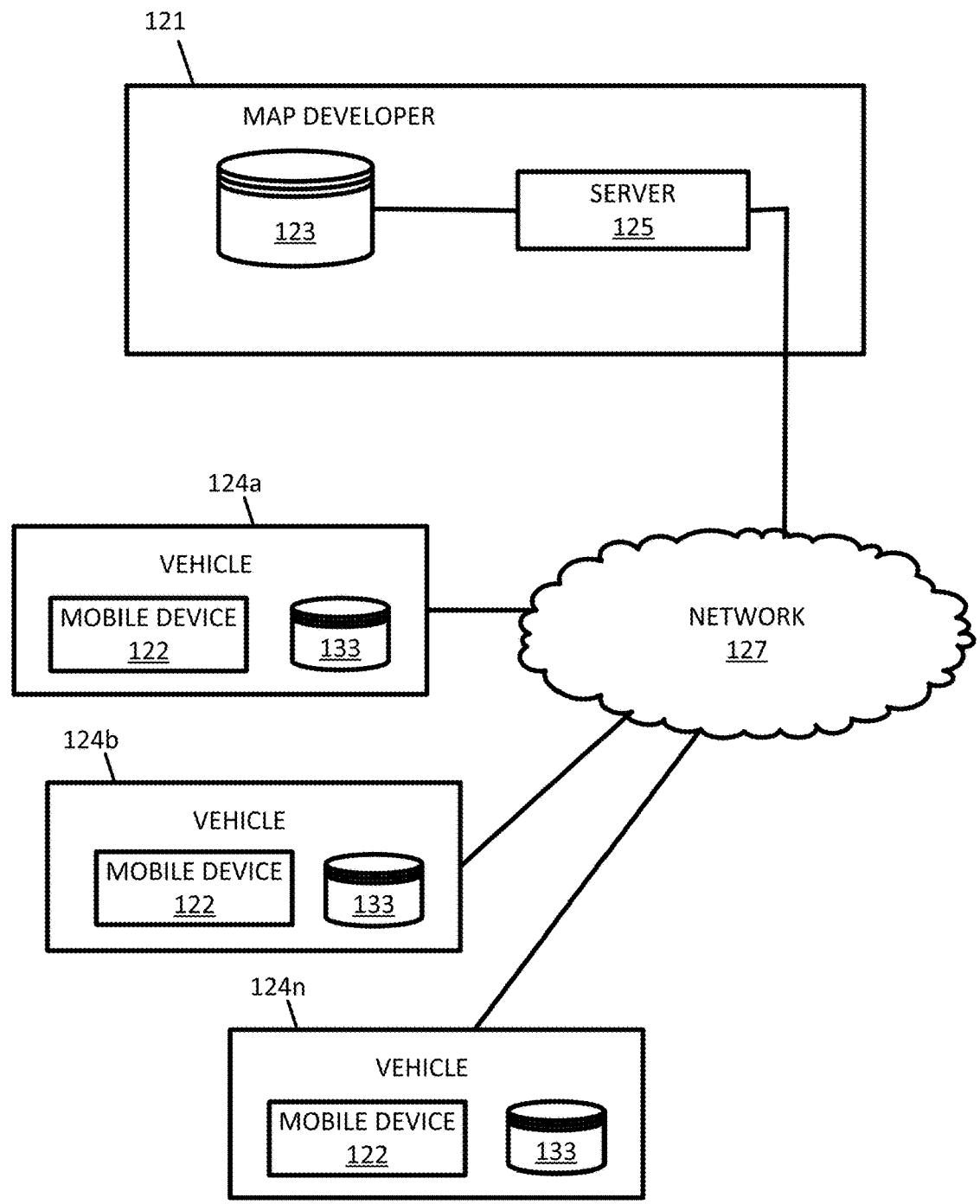
FIG. 1 illustrates an example system for generating local window-based two-dimensional (2D) occupancy grids for a location along a region of a roadway.

Example applications that utilize location data and benefit from increases in positional accuracy include localization applications, navigational applications, three-dimensional (3D) applications, obstacle avoidance applications, mapping applications, and building modeling applications. Localization applications may include a category of applications that match a set of observed data collected at a location to a known model of the surroundings. For example, the surroundings at any point may provide a signature of the location. Three-dimensional applications may include any application that provides a 3D model and places a location with that model. Example 3D applications include augmented reality, 3D navigation, and 3D mapping. Building modeling applications may include models of buildings, indoor environments, or architecture that are matched with a detected location. Obstacle avoidance and other mapping applications may also utilize observed data collected at a location in order to get a better understanding of the surroundings.

One example of a localization application is autonomous vehicle technology, where autonomous driving relies on object detection. To take advantage of high definition (HD) maps, autonomous vehicles may sense the environment and match detected objects or features to a map using a localization process. The localization process relies on pertinent structures in the world being present in the map. The map may break the continuous space of locations along a region of a roadway in the environment into local windows, where each window covers a region of the road network. For localization applications, locally windowed two-dimensional (2D) or three-dimensional (3D) occupancy grids may be generated for each local window. Two-dimensional occupancy grids may be more relevant for certain applications, since many environment models in vehicles utilize 2D technology, such as radar and ultrasonic sensors. Two-dimensional occupancy grids require less memory and are faster to load, making the localization process faster and more efficient with 2D occupancy grids versus 3D occupancy grids.

Each grid cell of the 2D occupancy grid is marked as either "occupied" or "unoccupied" based on whether sensor data is received for the area of the window represented by the respective grid cells. The structure of the scene for the region along the roadway may be fully encoded based on the occupancy information. One problem for certain localization applications, such as autonomous vehicles, is that maps may attempt to cover the region of the roadway with adjacent, non-overlapping or stacked local windows (i.e., in the vertical direction), which results in adjacent, non-overlapping 2D occupancy grids. However, this approach may be unsatisfactory as it cannot encode multiple roads at the same latitude/longitude location (e.g. an overpass or a bridge). The technical problem of existing 2D occupancy grids using this technique is that current 2D occupancy grids project structures above a roadway, such as bridges and overpasses, onto the 2D occupancy grid or plane. This results in the 2D occupancy grid falsely identifying a particular grid cell or cells as occupied, even though the area represented by those cells does not contain any pertinent structures, and thus any sensor data, along the roadway that would be useful for the various applications mentioned above. To resolve this technical problem, the proposed solution is to define 2D occupancy grids in overlapping, or stacked, windows covering contiguous regions of the road network, where the occupancy of each grid cell of the 2D occupancy grids is determined based on a predefined altitude range of sensor data collected for the areas represented by the grid cells. There is a need to continue to enable localization along all portions of a roadway, even though structures may be built above the roadway. The following embodiments provide improved techniques for providing more accurate 2D occupancy grids along an entire region of a roadway and create a simpler and more efficient map building system. Improved maps allow autonomous vehicles to move safely and reliably in ever-changing environments, providing precise and constantly updated information about their surroundings.

The following embodiments provide improvements for positional accuracy and identifying objects, or obstacles, within 2D occupancy grids by generating 2D occupancy grids using only sensor data within a predetermined altitude range. A 2D occupancy grid is a grid representing a 3D space. The 2D occupancy grid includes a plurality of grid cells that each represents a portion of the 3D space. In one example, the grid cells include the positional location of the grid cell and data indicative of whether the portion of the 3D space represented by the grid cell contains data for an object at that particular portion of the 3D space. Grid cells that contain data indicative of an object at the 3D space represented by that grid cell may be referred to as an "occupied grid cell." Likewise, a grid cell containing no data for an object at the 3D space represented by that grid cell may be referred to as an "unoccupied grid cell." In another example, the grid cell data includes the position within the grid cell for objects within the grid cell. Alternatively, the grid cells may not be encoded with relative position in the grid. The grid cells may be ordered in a logical sequence in which the sequence conveys the relative position in the grid.

Data indicative of an object at a particular 3D space may be considered point cloud data. A point cloud is a set of data points in space generally produced by 3D scanners. Point cloud data may be gathered from an aerial light detection and ranging (LiDAR) system, such as laser scanners. The LiDAR, or point cloud, data may include latitude, longitude, and altitude values. The point cloud data assigned to corresponding grid cells in a 2D occupancy grid may be limited to only point cloud data associated with objects within a certain distance above the road and may exclude point cloud data associated with a road surface. The process of assigning point cloud data to corresponding grid cells is dependent on various thresholds, such a predetermined altitude range, as well as the grid cell size used to produce the point cloud data. For example, the predetermined altitude range may be a range of data points having an altitude less than a clearance height of a structure built above a road surface. Limiting the point cloud data in this way avoids the problem of having over-the-road structures, such as bridges and overpasses, inaccurately identifying a particular grid cell or cells as occupied. Determining the occupancy of a particular grid cell based on the point cloud data assigned to that particular grid cell may also be limited by a predetermined threshold number of point cloud data points. For example, a grid cell may be identified as occupied when the number of point cloud data points assigned to that grid cell is above the predetermined threshold value. Likewise, a grid cell may be identified as unoccupied when the number of point cloud data points assigned to that grid cell is below the predetermined threshold value.

The following embodiments reduce the amount of computing and networking resources required to represent roadside objects of the 3D space and communicate features of the space using the 2D occupancy grids for applications such as localization. Voxels for a 3D space require a vast amount of storage space and bandwidth in order to be communicated in a mobile system. The following embodiments utilize 2D grid cells arranged in a 2D occupancy grid for only certain thresholds of point cloud data. Only the point cloud data meeting these thresholds may be stored or communicated. Thus, using a 2D occupancy grid to represent roadside objects greatly reduces the storage and/or bandwidth requirements, since this representation keeps most of the relevant information useful for localization while massively reducing the data size as compared to voxels of a 3D occupancy grid. The following embodiments also avoid the problem discussed above associated with structures built above a road surface, such as overlapping roadways, since the point cloud data assigned to grid cells of the 2D occupancy grid may be limited in altitude and quantity. The disclosed embodiments may also lead to an improvement in the computational system, e.g. in the way that roadway features data is validated using a decentralized mechanism. The increased efficiency and usage of resources may lead to less downtime, quicker implementation time, fewer errors, and as such, more efficient use of navigation services. The quicker implementation time and fewer errors may lead to more accurate up to date map data for navigation services.

FIG. 1 illustrates an example system for generating a local window-based 2D occupancy grid. In FIG. 1, one or more vehicles 124a, 124b, . . . 124n are connected to the server 125 though the network 127. The vehicles 124a-n may be directly connected to the server 125 or through an associated mobile device 122. A map developer system 121, including the server 125 and a geographic database 123, exchanges (e.g., receives and sends) data from the vehicles 124a-n. The mobile devices 122 include databases 133 corresponding to a local map, which may be modified according to the server 125. The mobile device 124a-n may be standalone device such as smartphones or devices integrated with vehicles. Additional, different, or fewer components may be included.

One of the vehicles 124 may be a collection vehicle, which is discussed in more detail below with respect to FIG. 7. The collection vehicle may include one or more distance data collection device or sensor, such as a light detection and ranging (LiDAR) device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

The mobile device 122 and/or the server 125 identifies a set of local windows associated with a region of a roadway. To identify the set of local windows, the mobile device 122 and/or the server 125 identifies a maximum separation distance between center points of the local windows, determines a size and resolution of the local windows, calculates a minimum number of local windows needed to cover the region of the roadway based on the size of the local windows, and defines the minimum number of local windows as the set of local windows. An example of identifying a set of local windows is described in more detail below in reference to FIG. 2.

The mobile device 122 and/or the server 125 receives point cloud data collected by a distance sensor and describing the vicinity of the region of the roadway. The point cloud is formed of points or pixels, each of which may include an intensity and location data. The location data may be a three component coordinate (e.g., [x, y, z]) or a direction and a distance. The direction may be defined as a first angle from a two reference planes (e.g., [alpha, beta, distance]), or as a direction of travel. The reference planes may be a horizontal plane parallel to the surface of the Earth and a vertical plane perpendicular to the surface of the Earth.

The mobile device 122 and/or the server 125 assigns the point cloud data to corresponding grid cells within the set of local windows based on a predetermined altitude range. To assign the point cloud data to grid cells, the mobile device 122 and/or the server 125 may exclude point cloud data associated with a road surface at the region of the roadway. For example, the mobile device 122 and/or the server 125 may filter out or remove data points from the point cloud corresponding to the roadway. The road surface may be defined as the area between the edges of the roadway. The remaining point cloud data represents the environment at the region of the roadway on each side of the road surface. The point cloud data may be filtered according to other parameters. The point cloud data may also be reduced by a threshold distance in each dimension. The mobile device 122 and/or the server 125 may assign the portion of the point cloud data associated with a side of the road surface at the region of the roadway to corresponding grid cells. The corresponding grid cells may also represent both sides of the road surface at the region of the roadway.

Assigning point cloud data based on a predetermined altitude range may also include excluding point cloud data points based on an altitude value, or height, of the data point above the road surface at the region of the roadway. To do so, the mobile device 122 and/or the server 125 identifies a predetermined altitude, or height, range for which to exclude data points. The mobile device 122 and/or the server 125 then determines an altitude, or height above the road surface at the region of the roadway, for each of the point cloud data points and filters out data points of each of the grid cells that fall outside the predetermined height or altitude range. Excluding data points outside the predetermined threshold is described in more detail below in reference to FIGS. 3 and 4. Examples of data points filtered by height or altitude are described in more detail below in reference to FIG. 4.

The mobile device 122 and/or the server 125 determines a grid cell occupancy for the grid cells within the set of local windows. The mobile device 122 and/or the server 125 may determine occupancy based on a predetermined threshold number of point cloud data points assigned to corresponding grid cells. The mobile device 122 and/or the server 125 determines which grid cells of the local window are occupied. As discussed above, an "occupied" grid cell is a grid cell that contains data indicative of an object at the 3D space represented by that grid cell. Similarly, an "unoccupied" grid cell is a grid cell containing no data for an object at the 3D space represented by that grid cell. The grid cell occupancy may be a binary indication (e.g., 1 or 0, on or off) that the grid cell has been included to represent an object at the 3D space. For example, an indication of 1 or on may indicate that the grid cell is occupied, and an indication of 0 or off may indicate that the grid cell is unoccupied. This indication may also be reversed, where 1 and on indicate unoccupied and where 0 and off indicate occupied. Other two value binary indicators now known or later developed are possible.

To determine grid cell occupancy, the mobile device 122 and/or the server 125 may first determine a number of point cloud data points assigned to a corresponding grid cell. The mobile device 122 and/or the server 125 may then determine whether the corresponding grid cell is occupied or unoccupied based on a predetermined threshold number of point cloud data points. For example, a grid cell may be determined to be occupied when the number of point cloud data points assigned to the corresponding grid cell is above the predetermined threshold. Similarly, the grid cell may be determined to be unoccupied when the number of point cloud data points assigned to the corresponding grid cell is below the predetermined threshold. The predetermined threshold number of point cloud data points may be, for example, 5 data points. Other predetermined numbers of data points may be used (e.g., 3, 10, 25, 50, 100, or another number). Point cloud data points not meeting the predetermined threshold are not utilized by the mobile device 122 and/or the server 125 in the system for generating a 2D occupancy grid, such as the system of FIG. 1. Discarding, or ignoring, portions of point cloud data points does not take into account the dimensions of the grid (e.g., whether the grid is 2×3 or 1×19). All point cloud data points that do not meet this threshold are discarded. An example of determining grid cell occupancy is described in more detail below in reference to FIGS. 3 and 4.

After assigning point cloud data and determining grid cell occupancy, the mobile device 122 and/or the server 125 may generate a 2D occupancy grid based on the grid cell occupancy. As described above, a 2D occupancy grid is a grid representing a 3D space. The 2D occupancy grid includes a plurality of grid cells that each represents a portion of the 3D space. A 2D occupancy grid may include one or more rows, as shown below in FIG. 3. The 2d occupancy grid may act as a signature for the location along the region of the roadway. This signature may be used by vehicle applications, such as assisted driving or navigation applications. Examples of assisted driving applications include autonomous vehicles, highly assisted vehicles, or advanced driving assistance systems. For example, localization applications may use the 2D occupancy grid acting as a signature in order to identify exactly where the vehicle is on the road in real time, along with its immediate surroundings.

The mobile device 122 and/or the server 125 may encode the 2D occupancy grid as a 2D binary occupancy image. This is described in more detail below in reference to FIG. 5. The mobile device 122 and/or the server 125 may store the 2D binary occupancy image in a database 123 or 133. The mobile device 122 and/or the server 125 may filter individual grid cells as "noise." That is, when a grid cell includes only a single point, or less than a threshold number of points, the grid cell may be determined to include noise and be labeled as not occupied. In another example, as isolated grid cell that does not border another occupied grid cell may be considered noise and be labeled as not occupied. This ensures that the retained grid cells contain relevant information and correspond to objects useful for localization. Objects useful for localization are objects that easily detectable, uniquely define or represent the location of the object, and objects that will not change frequently. Some examples of objects useful for localization include long, continuous objects on or near a roadway, such as guardrails and barriers, or other larger structures, such as buildings and larger roadside signs. One example of a barrier may be a jersey barrier, which is a modular concrete or plastic barrier often used to separate lanes of traffic, reroute traffic, or protect pedestrians or construction workers. Objects not useful for localization are objects that are temporary and objects that do not uniquely identify a particular location. Some examples of objects not useful for localization include temporary objects, such as pedestrians or animals on or near a roadway, some vegetation that are not unique to a particular location, such as shrubbery, leaves or small branches of a tree, certain geographical features, and small objects, such as poles and hydrants. Filtering grid cells as noise, based on their similarity to other grid cells in adjacent rows of grid cells, reduces the amount of computing and networking resources required to represent roadside objects of the 3D space and improves the ability to communicate features of the space using the 2D occupancy grid more efficiently. One example of filtering includes thresholding the grid cell values against learned parameters in a decision tree. This technique of filtering involves machine learning and may utilize neural networks.

The mobile device 122 and/or the server 125 may provide the generated 2D occupancy grid to content providers, such as a map developer 121 or an applications developer, to include the 2D occupancy grid in detailed maps of locations or applications, such as mobile applications, using location related information. The 2D occupancy grid may also be provided to end users, such as other mobile devices 122 or vehicles 124, in order to perform localization techniques. The 2D occupancy grid may be provided to other various services or providers as well, such as navigational services or traffic server providers. The 2D occupancy grid may also be provided for non-localization functions, such as being provided to highway engineers to identify areas not containing any roadside objects. As discussed above, the 2D occupancy grid may be provided in a binary file format.

Figure 2:
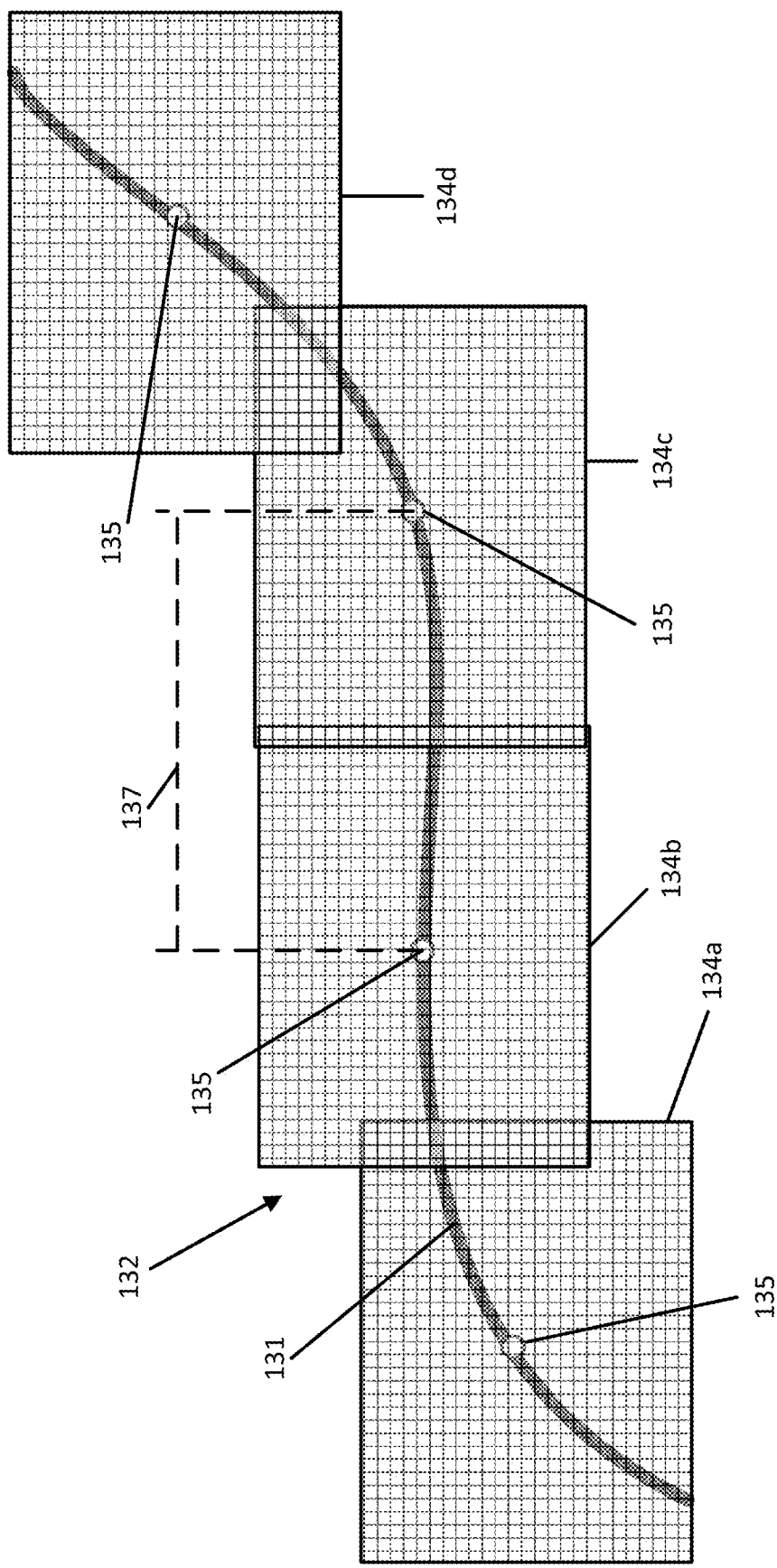
FIG. 2 illustrates an example set of local windows at a region of a roadway.

FIG. 2 illustrates an example set of local windows 132 at a region of a roadway 131. The mobile device 122 and/or the server 125 identifies a maximum separation distance 137 between center points 135 of adjacent local windows 134a-d. The center points 135 may be points equally spaced along a center-line of the region of the roadway 131 based on the maximum separation distance 137. The mobile device 122 and/or the server 125 may then determine a size and resolution of the local windows 134a-d. The size of the local windows 134a-d of the set of local windows 132 may be predetermined based on a number of parameters, such as height, width, or amount of overlap between local windows 134, if any. The parameters may be defined by content providers, such as application developers or map developers, end users, navigational services or traffic server providers. The size of each of the local windows 134 of the set of local windows 132 may be the same. However, the size of each of the local windows 134 of the set of local windows 132 may also be different, or adaptive. For optimization purposes, it may be advantageous for vehicle applications to use local windows 134 of the same size as opposed to adaptive window sizes, since adaptive window sizes may require an increased amount of computing and/or networking resources required to load and utilize the local windows 134.

The size of the local windows 134 may be determined in such a way to ensure that the set of local windows 132 adequately cover the region of the roadway 131. For example, adequate coverage may be achieved if no gaps are present between adjacent local windows 134. For vehicle applications, such as localization techniques, it is advantageous to have complete coverage for a region of roadway of interest 131. Spaces or gaps between local windows 134 may result in missing data associated with the region of the roadway 131, which in turn may have negative consequences for vehicle applications and result in unsafe operation of vehicles, particularly with assisted driving applications. As an example, vehicles travelling along a roadway 131 may load and unload the local windows 134a-d in sequence. For example, with reference to FIG. 2, a vehicle may unload local window 134a as the vehicle moves along the roadway 131 into local window 134b. Since, as shown in FIG. 2, local windows 134a and 134b overlap, the vehicle application using the local windows 134 would have context from the past local window 134a as the vehicle moves into and loads the new local window 134b. Without the overlap between local windows 134a and 134b, the vehicle application may not have appropriate context to match the surrounding environment to the location of the vehicle, which may result in the vehicle application not functioning properly.

As shown in FIG. 2, the set of local windows 132 cover the region of the roadway 131 such that gaps are not present between the local windows 134a-d. Also as shown in FIG. 2, the local window 134a-d sizes are the same. However, as discussed above, the local window 134 sizes may be different. For example, referring to FIG. 2, local window 134a and local window 134d may each be two or three times larger than the size shown in FIG. 2, while local windows 134b and 134c may be twice as small. In this example, local windows 134a and 134d may overlap, such that local windows 134b and 134c are not needed to provide adequate coverage of the region of the roadway 131, since no gaps would be present between local windows 134a and 134d. It may also be possible to have adequate coverage for the region of the roadway 131 with no overlap between local windows 134. For example, adequate coverage may be achieved if each local window 134 was directly adjacent to each other and their respective boundaries matched up precisely with one another.

The mobile device 122 and/or the server 125 may calculate a minimum number of local windows 134 needed to cover the region of the roadway 131. This calculation may be based on the size of the local windows 134 determined in the previous step. For example, as shown in FIG. 2, the minimum number of local windows 134 needed to cover the region of the roadway 131 is four (134a-d). However, in the example provided above where local windows 134a and 134d provide adequate cover by overlapping one another, the minimum number of local windows 134 needed to cover the region of the roadway 131 would be two (134a and 134d). The mobile device 122 and/or the server 125 may then define the minimum number of local windows 134 that cover the region of the roadway 131 as the set of local windows 132.

Figure 3:
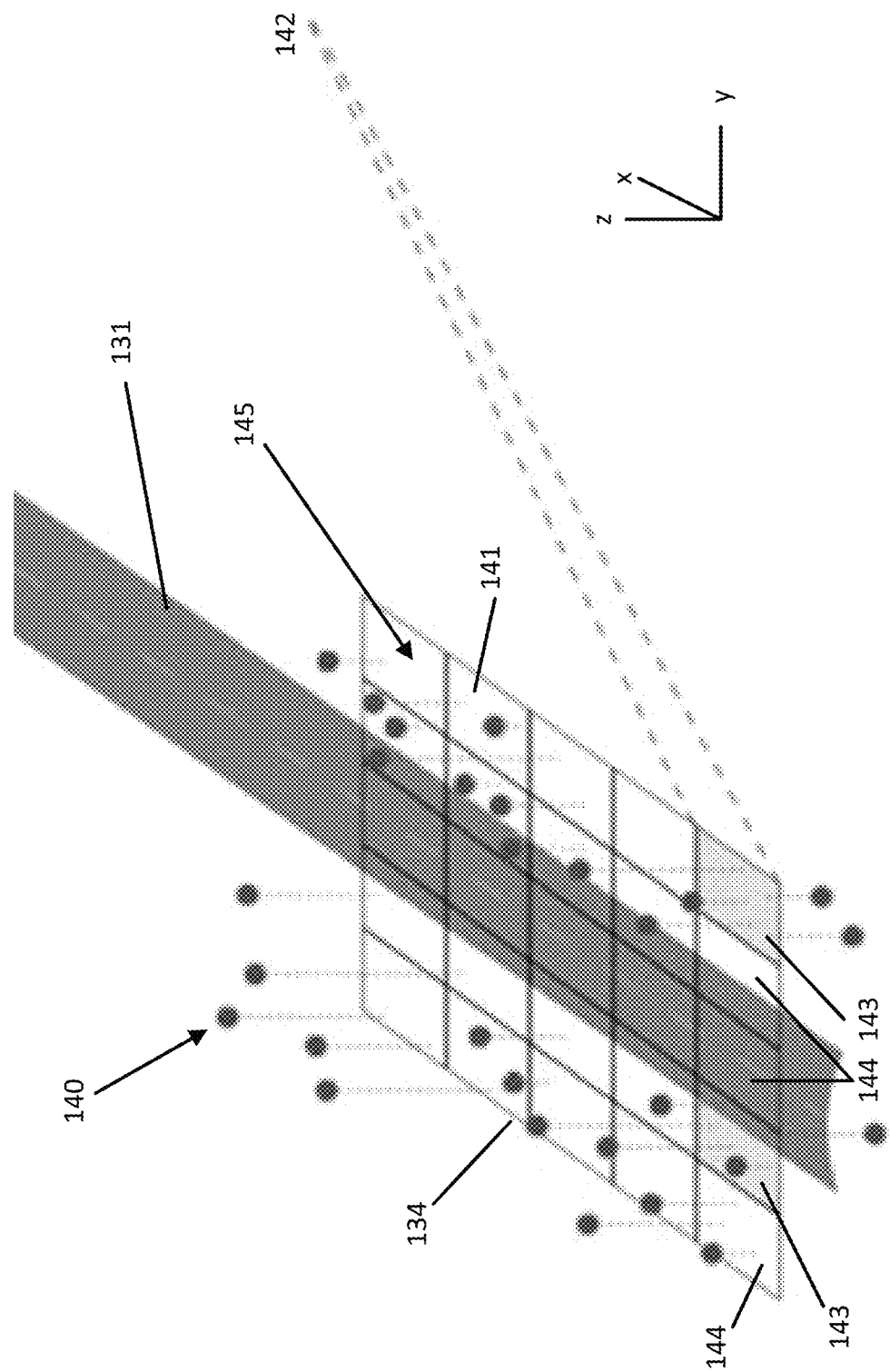
FIG. 3 illustrates an example 2D occupancy grid representing point cloud data assigned to corresponding grid cells of a local window of FIG. 2.

FIG. 3 illustrates an example 2D occupancy grid 145 representing point cloud data 140 assigned to corresponding grid cells 141 of a local window 134 of FIG. 2. The 2D occupancy grid 145 includes a plurality of grid cells 141 representing a three-dimensional space. Each grid cell 141 of the plurality of grid cells 141 represents a portion of the three-dimensional space. As discussed above, the mobile device 122 and/or the server 125 receives point cloud data 140 for the region of the roadway 131 and then assigns the point cloud data 140 to corresponding grid cells 141 within the set of local windows 132. The mobile device 122 and/or the server 125 may assign point cloud data 140 based on a predetermined altitude range. To assign the point cloud data 140, the mobile device 122 and/or the server 125 may exclude point cloud data 140 associated with a road surface at the region of the roadway 131 and assign a portion of the point cloud data 140 associated with a side of the road surface at the region of the roadway 131. As shown in FIG. 3, the point cloud data 140 includes latitude, longitude, and altitude values, corresponding to the x,y,z planes.

The mobile device 122 and/or the server 125 determines a grid cell occupancy for the grid cells 141 within the set of local windows 132 based on a predetermined threshold of point cloud data 140 assigned to corresponding grid cells 141. The mobile device 122 and/or the server 125 then generates a 2D occupancy grid 145 as the signature for the location along the region of the roadway 131. The 2D occupancy grid 145 may be generated for a window 134 of the set of local windows 132 based on the determined grid cell occupancy for the grid cells 141 within the window 134. Each grid cell 141 of the plurality of grid cells 141 also includes data indicative of the grid cell occupancy. As discussed above, the grid cell occupancy indicates whether the portion of the three-dimensional space represented by the grid cell 141 contains data for an object at the portion of the three-dimensional space. In FIG. 3, the grid cell occupancy is only shown for one row 142 of the 2D occupancy grid 145. In this example, grid cells 143 are shown as occupied and grid cells 144 are shown as unoccupied. As indicated above, the determination of whether the grid cells 141 are occupied or unoccupied is based on the number of point cloud data points 140 assigned to the corresponding grid cell 141. In the example shown in FIG. 3, the number of point cloud data points 140 assigned to grid cells 144 is below the predetermined threshold (i.e., unoccupied) while the number of point cloud data points 140 assigned to grid cells 143 is above the predetermined threshold (i.e., occupied). This is shown in more detail in FIG. 4, discussed below.

Figure 4:
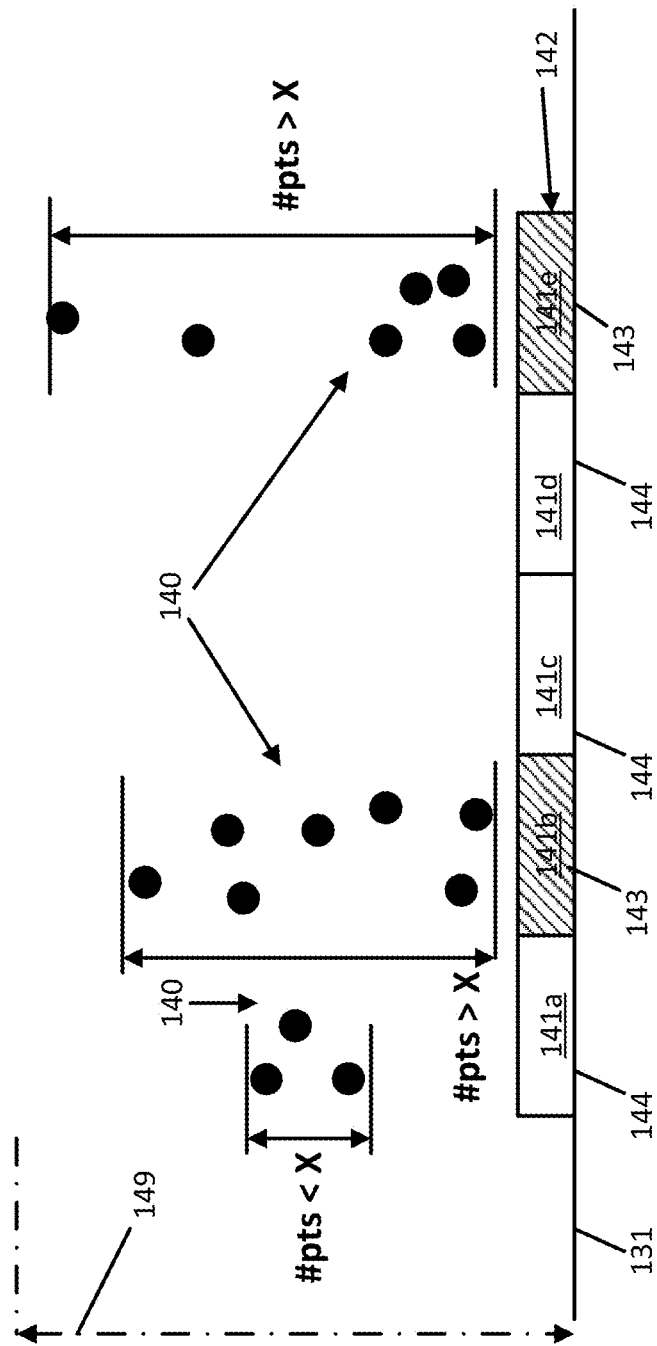
FIG. 4 illustrates an example of a single row of the 2D occupancy grid of FIG. 3 and how grid cell occupancy is determined.

FIG. 4 illustrates a side view representation of the single row 142 of the 2D occupancy grid 145 of FIG. 3. As shown in FIG. 4, the point cloud data 140 is assigned to corresponding grid cells 141a-e within the set of local windows 132 based on a predetermined altitude range 149. The predetermined altitude range 149 is shown at the left side of FIG. 4, and may be predetermined based on altitudes, or clearance heights, of structures built above roadways. In the example shown in FIG. 4, grid cells 141a, 141b, and 141e contain point cloud data points 140 within the predetermined altitude range 149. Thus, those point cloud data points 140 are assigned to those respective grid cells 141. Grid cells 141c and 141d either have no point cloud data points 140 associated with the 3D space that they represent, or those grid cells 141c,d only contain point cloud data points 140 outside of the predetermined altitude range 149. Next, a grid cell occupancy is then determined for each grid cell 141a-e based on a threshold number X of point cloud data points 140 assigned to each grid cell 141. As shown in FIG. 4, there are three point cloud data points 140 assigned to grid cell 141a. As indicated in FIG. 4, the number of point cloud data points 140 assigned to grid cell 141a is less than the predetermined number X. Thus, grid cell 141a is determined to be unoccupied 144. Since, as discussed above, there are no point cloud data points 140 assigned to grid cells 141c and 141d, these grid cells are also determined to be unoccupied 144. As shown in FIG. 4, there are seven point cloud data points 140 assigned to grid cell 141b. As indicated in FIG. 4, this number of point cloud data points 140 assigned to grid cell 141b is greater than the predetermined number X. Thus, grid cell 141b is determined to be occupied (shaded) 143. Similarly, as shown in FIG. 4, there are six point cloud data points 140 assigned to grid cell 141e and, as indicated in FIG. 4, this number of point cloud data points 140 is greater than the predetermined number X. Thus, grid cell 141e is also determined to be occupied (shaded) 143.

As indicated above, in order for a grid cell 141 to be indicated as occupied 143, the mobile device 122 and/or the server 125 must first determine an altitude, or height above the road surface at the region of the roadway 131, for each of the point cloud data points 140 and filter out data points 140 of each of the grid cells 141 that fall outside the predetermined height or altitude range 149. Then, the mobile device 122 and/or the server 125 must determine a grid cell occupancy for each grid cell 141 based on a threshold number X of point cloud data points 140 assigned to each grid cell 141. The filtering of point cloud data points 140 that fall outside the predetermined height or altitude range 149 is important in order to exclude point cloud data points 140 that may correspond to structures built above a roadway, but that, if not excluded, may cause problems for certain vehicle applications. As discussed above, the problem with existing 2D occupancy grids is that they represent structures above a roadway, such as bridges and overpasses, on the 2D occupancy grid as occupied cells, even though the area represented by those cells does not contain any pertinent structures. To alleviate this problem, the 2D occupancy grids of the current application exclude point cloud data points 140 that may correspond to structures built above a roadway, such as another roadway (i.e., an overpass, a bridge, or a tunnel above a road). Other structures built above roadways may include restaurants (such as the Illinois Tollway oases), commercial/residential buildings (such as the former U.S. Post Office over I-290 in Chicago), railroad tracks, plazas and parks (such as the National Mall in Washington D.C.), transportation stations, airports (such as the runway of NAS Norfolk-Chambers Field that passes directly over I-564 in Virginia), rest areas, parking garages, and monuments (such as the Great Platte River Road Archway Monument over I-80 in Nebraska).

For many vehicle-based applications utilizing 2D occupancy grids 145, only a certain height range of the region of the roadway 131 may be of concern. Generating 2D occupancy grids 145 based on a predetermined altitude range 149 as discussed above allows vehicle applications to utilize local windows 134 and corresponding 2D occupancy grids 145 that cover contiguous regions of a road network and greatly reduces the likelihood of vehicle applications using 2D occupancy grids 145 that falsely identify grid cells 141 as occupied. Generating 2D occupancy grids 145 based on a predetermined altitude range 149 also allows users to access layered occupancy grids, where two or more occupancy grids may be layered and correspond to the same latitude and longitude coordinates, but at different altitudes, or levels. For example, vehicle A travelling along roadway Y may be able to access a first 2D occupancy grid corresponding to a local window at a certain latitude and longitude and, at the same time, vehicle B travelling along roadway Z that passes directly overhead of roadway Y may be able to access a second 2D occupancy grid corresponding to a local window at the same latitude and longitude, but at a different altitude, as that of vehicle A's 2D occupancy grid. Thus, local window-based 2D occupancy grids generated based on a predetermined altitude range 149 may be made available for different layers, levels, or altitudes and allow more coverage of roadways and allow for simultaneous access to 2D occupancy grids at the same location (i.e., same latitude and longitude).

Figure 5:
FIG. 5 illustrates an example of a 2D occupancy grid encoded as a 2D binary occupancy image.

FIG. 5 illustrates an example 2D occupancy grid 145 encoded as a 2D binary occupancy image 150 for a region of a roadway. As discussed above, the grid cell occupancy may be a binary indication (e.g., 1 or 0, on or off, + or −) that indicates whether a grid cell 141 includes data indicative of an object at the 3D space the grid cell 141 represents. For example, an indication of 1, on, or + may indicate that the grid cell is occupied, and an indication of 0, off, or − may indicate that the grid cell is unoccupied, or vice versa. Any binary indication having two possible values may be used, whether now known or later developed. The 2D binary occupancy image 150 may be generated by the mobile device 122 and/or the server 125 as an efficient description of objects that correspond to the location data and as a signature of the surrounding of the location data. Two-dimensional occupancy grids 145 encoded as a 2D binary image 150 require less memory and are faster to load, making applications, such as localization processes, faster and more efficient than compared with existing 2D occupancy grids and 3D occupancy grids. As stated above, the increased efficiency and usage of resources may lead to less downtime, quicker implementation time, fewer errors, and as such, more efficient use of vehicle applications, such as localization and navigation services. For example, the quicker implementation time and fewer errors may lead to more accurate up to date map data for navigation services. The mobile device 122 and/or the server 125 may also compress a 2D binary occupancy image 150 to further reduce the amount of computing and networking resources required to communicate and store the 2D binary occupancy image 150. The compressed, or simplified, 2D binary occupancy image 150 thus requires less storage and bandwidth requirements.

As discussed above, the mobile device 122 and/or the server 125 may provide the compressed 2D binary occupancy image 150 to content providers, such as a map developer 121 or an applications developer, to include the 2D binary occupancy image 150 in detailed maps of locations or applications, such as mobile applications, using location related information. The 2D binary occupancy image 150 may also be provided to end users, such as other mobile devices 122 or vehicles 124, in order to perform localization techniques. The 2D binary occupancy image 150 may be provided to other various services or providers as well, such as navigational services or traffic server providers.

Figure 6:
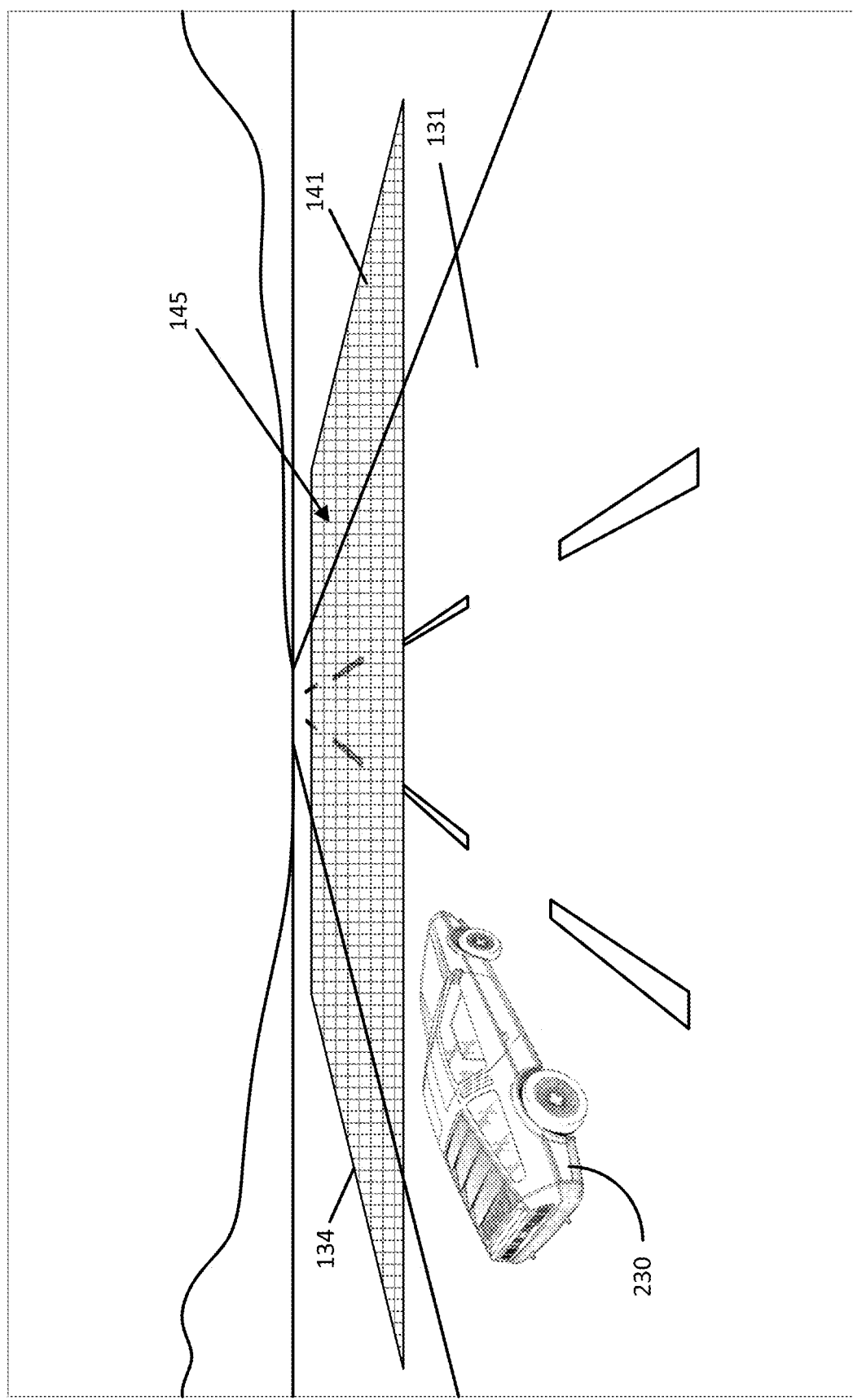
FIG. 6 illustrates an example 2D occupancy grid at a region of a roadway being used for localization.

FIG. 6 illustrates an example localization application for the 2D occupancy grid 145 at a region of a roadway 131. The roadway 131 is associated with local windows 134 and 2D occupancy grids 145 at specific locations. In one example, a set of 2D occupancy grids is stored for each predetermined section of road, or chunk, of the roadway 131, such as for each local window 134 of a set of local windows 132 covering the region of the roadway 131. For example, the vehicle 230 of FIG. 6 is traveling at a particular location of the roadway 131 associated with a local window 134 and 2D occupancy grid 145. In a localization technique, as a vehicle 230 travels down the region of the roadway 131, the local window 134 associated with the region of the roadway 131 is identified based on a location of a user 230. A 2D occupancy grid 145 associated with the local window 134 is then accessed. As discussed above, the 2D occupancy grid 145 represents roadside objects at the region of the roadway 131 and is generated based on a predetermined threshold of point cloud data 140 assigned to corresponding grid cells 141 within the 2D occupancy grid 145. Next, sensor data is received from the user 230 and compared with the 2D occupancy grid 145. The received data may be range data (e.g., LiDAR) or image data (e.g., camera). A comparison of the received data and the 2D occupancy grid 145 determines the location of the vehicle 230. In one example, the vehicle 230 is matched with the predetermined section of road. In another example, the vehicle 230 is matched with a relative location along the predetermined section of road.

Figure 7:
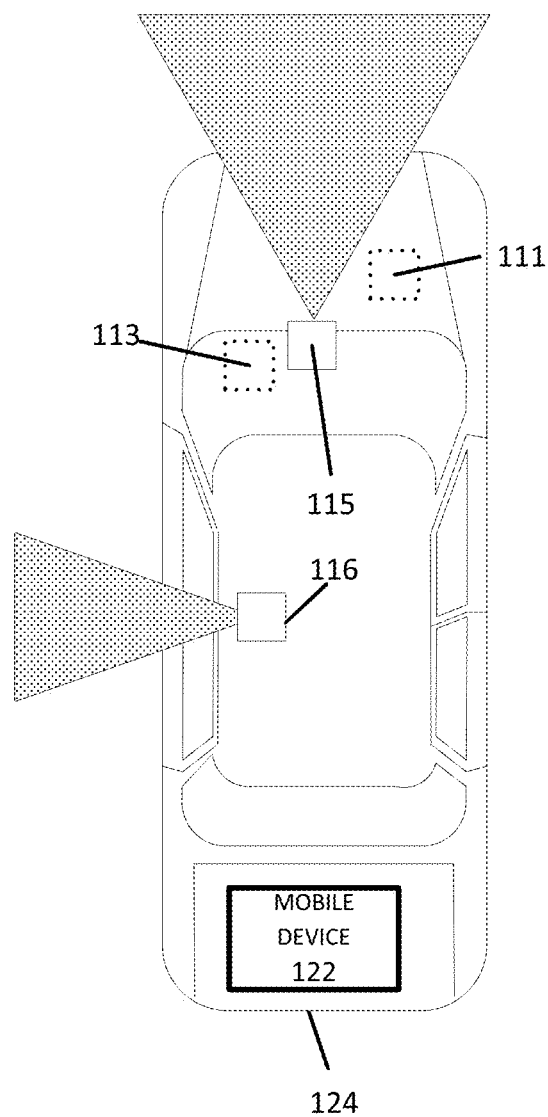
FIG. 7 illustrates an exemplary vehicle of the system of FIG. 1.

FIG. 7 illustrates an exemplary vehicle of the system of FIG. 1. FIG. 7 illustrates an example vehicle 124 for collecting data for the 2D occupancy grids 145 and/or for performing localization using the generated 2D occupancy grids 145 and subsequently collected distance data. A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS signal. Alternatively or additionally, the one or more detectors or sensors may include an accelerometer built or embedded into or within the interior of the vehicle 124.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125, which may have been updated according to the collection of data in the embodiments described herein. The assisted driving vehicle may select a route based on any of the examples herein, including in response to current location based on a comparison of the local sensor data to object polylines for a signature of the location.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

In a localization technique, as a vehicle 124 travels down a region of a roadway 131, an onboard processor accesses 2D occupancy grid 145 associated with the region of the roadway 131. The onboard processor receives sensor data from the vehicle sensor array, including the optical distance system such as LiDAR 116 and the image capture system 115 such as a camera, from the region of the roadway 131 and compares the sensor data with the 2D occupancy grid 145. The vehicle 124 performs localization based on the comparison of the sensor data with the 2D occupancy grid 145.

Figure 8:
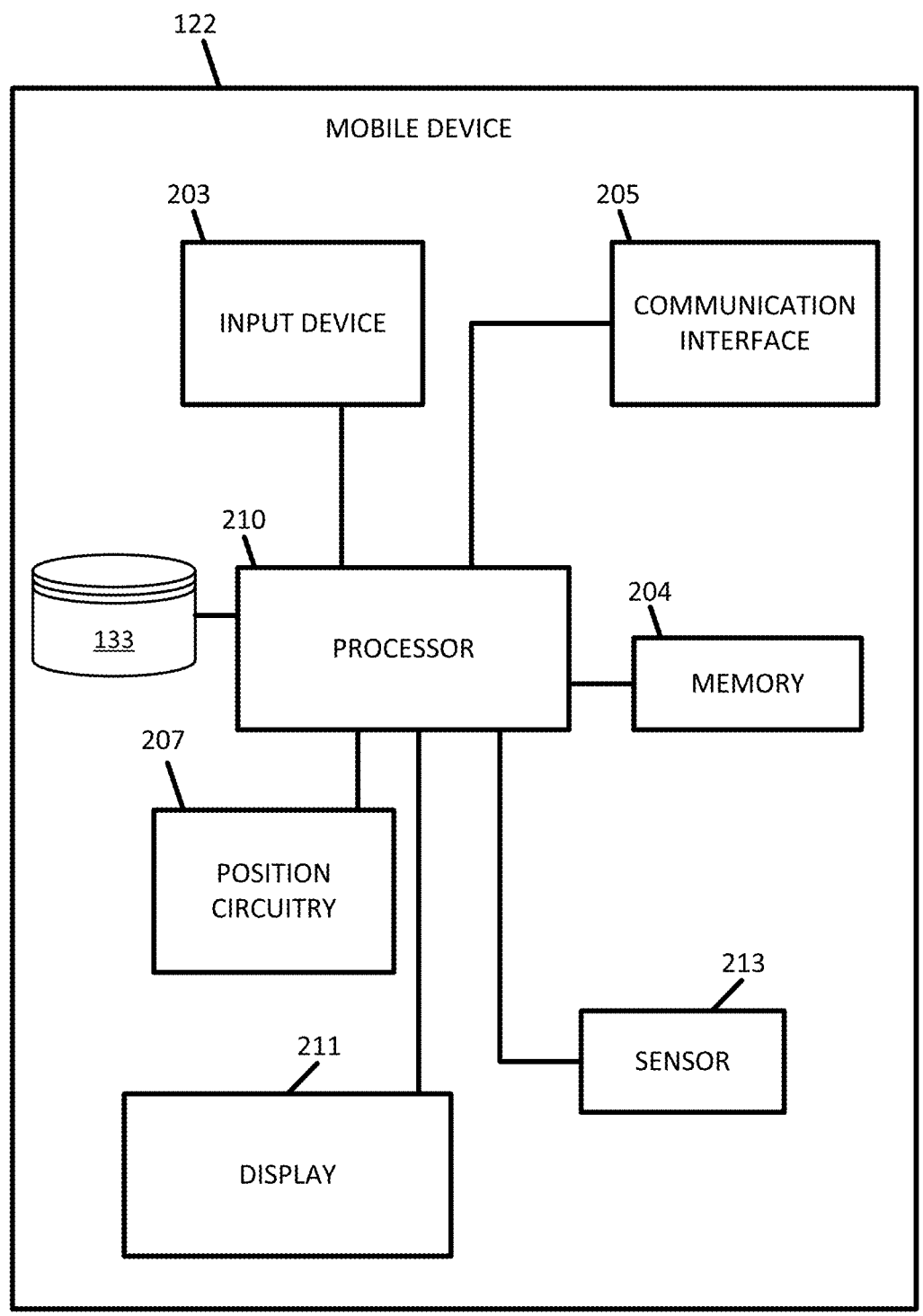
FIG. 8 illustrates an example mobile device.

FIG. 8 illustrates an exemplary mobile device 122 of the system of FIG. 1. The mobile device 122 includes a processor 210, a vehicle database 133, a memory 204, an input device 203, a communication interface 205, position circuitry 207, a display 211, a sensor 213. The input device 203 may receive settings to enable or disable the mobile device for collecting observations. Additional, different, or fewer components are possible for the mobile device 122.

Figure 9:
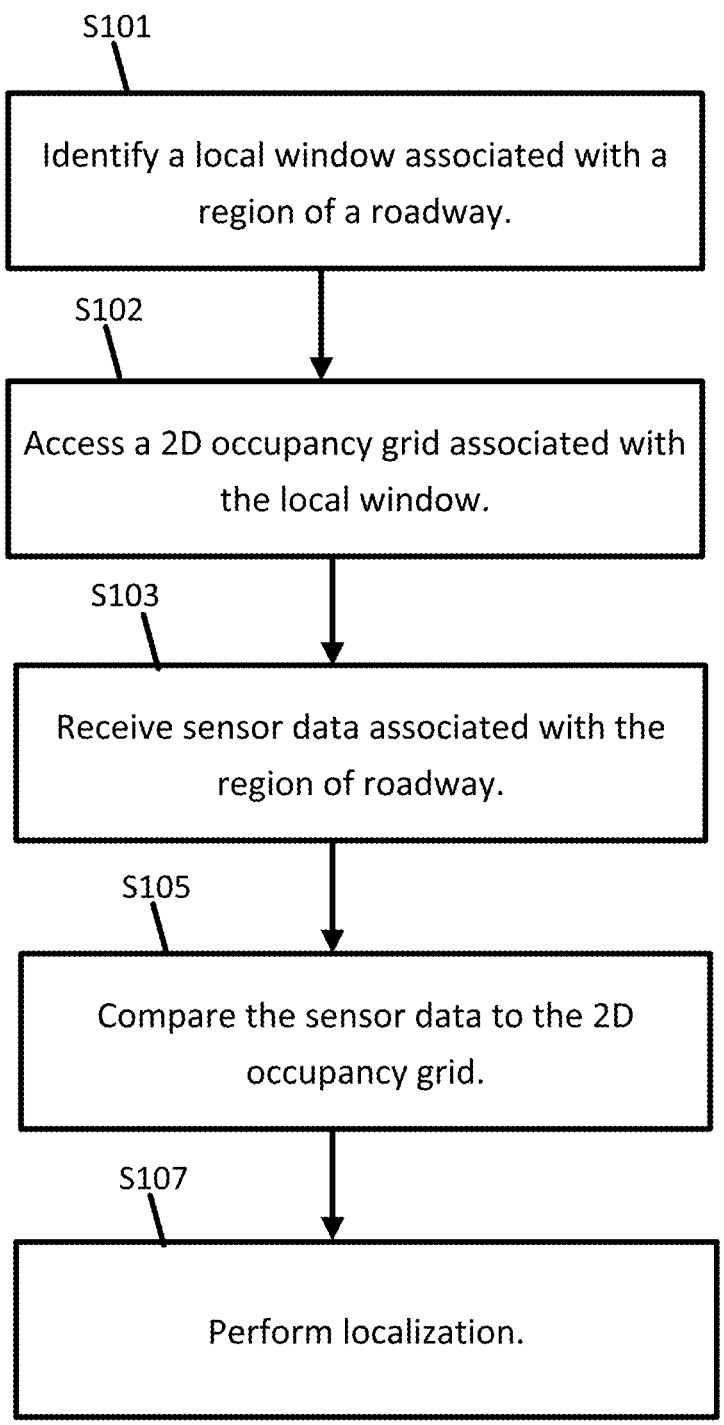
FIG. 9 illustrates an example flowchart for the mobile device of FIG. 8.

FIG. 9 illustrates an example flowchart for the mobile device of FIG. 8. Additional, different, or fewer steps may be included.

At act S101, the processor 210 identifies a local window 134 associated with the region of the roadway 131. The local window 134 is identified based on a location of a user 230 at a region of a roadway 131. The local window 134 may be stored in the database 133 or memory 204 and are associated with a region of a roadway 131 corresponding to the position of the mobile device 122. The position circuitry 207 or the processor 210 detects a geographic position of the mobile device 122 and may send the geographic location for the mobile device 122 to a server. The position circuitry 207 is one example means for detecting or determining a geographic position. The processor 210 also includes circuitry serving as means for detecting or determining a geographic position. The detected geographic position of the mobile device 122 may include a latitude and longitude pair. The geographic position may be detected or sampled at periodic intervals in time or distance, or may be continuously detected. The sensor 213, which may include distancing sensors, range sensor, image sensors, or another sensor as described with respect to FIG. 12 may also provide information for determining the geographic position of the mobile device 122.

At act S102, the processor 210 accesses a 2D occupancy grid 145 associated with the local window 134 identified in act S101. The 2D occupancy grid 145 may be stored in the database 133 or memory 204 and is associated with objects at the region of the roadway 131 corresponding to the position of the mobile device 122. The 2D occupancy grid 145 may have been generated by the server as an efficient description of objects that correspond to the location data and as a signature of the surrounding of the location data. The 2D occupancy grid 145 may have been generated by the server based on a predetermined threshold of point cloud data 140 assigned to corresponding grid cells 141 within the 2D occupancy grid 145.

At act S103, the processor 210 or the communication interface 205 receives sensor data associated with the region of the roadway 131. The communication interface 205 is an example for a means for receiving the sensor data. The processor 210 may include circuitry or a module or an application specific controller as a means for receiving the sensor data. The processor 210 or the communication interface 205 may receive sensor data from the vehicle sensor array, including the optical distance system such as LiDAR 116 and the image capture system 115 such as a camera. The processor 210 or the communication interface 205 may receive sensor data from the sensor 213, which may include distancing sensors, range sensor, image sensors, or another sensor as described with respect to FIG. 7.

At act S105, the processor 210 compares the sensor data received in act S103 with the 2D occupancy grid 145 accessed in act S102. The processor 210 compares a value, or values, of each 2D occupancy grid 145 to the corresponding sensor data. The value or values of the 2D occupancy grid 145 may be a signature vector or may be values for each grid cell 141 of the 2D occupancy grid 145, and the sensor data may be arranged in a similar manner. The processor 210 compares the signature to the sensor data to calculate a number of matching data points. The processor 210 may include circuitry or a module or an application specific controller as a means for comparing the sensor data to the 2D occupancy grid 145.

At act S107, the processor 210 calculates or determines a location for the mobile device 122 based on the comparison of act S105. The processor 210 may include circuitry or a module or an application specific controller as a means for determining the location of the mobile device 122 based on the 2D occupancy grid 145 and sensor data comparison. The processor 210 may determine a number of matching points of a 2D occupancy grid 145 based on the comparison of the signature to the vicinity data. When a certain number of points match, the processor 210 determines that the current location of the mobile device 122, or a location when the vicinity data was detected, corresponds to the 2D occupancy grid 145. The match may be determined when a predetermined quantity of points match the vicinity data. The match may be determined when a predetermined percentage of the points (e.g., 50%, 90%, or 99%) match the vicinity data. The position circuitry 207 may have determined an estimate of the geographic position, and the comparison of act S105 and the calculation of act S107 provides a refinement or otherwise improves on the accuracy of the estimate of the geographic position. Alternatively, the position circuitry 207 may be omitted and only the acts of S105 and S107 determine the geographic position.

Acts S101 through S107 may be performed automatically by the mobile device 122. For example, acts S101 through S107 may initiate whenever the geographic position of the mobile device 122 is detected or sampled. This may happen at periodic intervals in time or distance, or may be continuous as the mobile device 122 moves from location to location.

The processor 210 may include a routing module including an application specific module or processor that calculates routing between an origin and destination. The routing module is an example means for generating a routing command based on the current location of the mobile device 122 from the 2D occupancy grid 145 comparison. The routing command may be a route from the route to the destination. The routing command may be a driving instruction (e.g., turn left, go straight), which may be presented to a driver or passenger, or sent to an assisted driving system. The display 211 is an example means for displaying the routing command. The routing command may be derived from a road network or map data stored in database 133. The database 133 is an example means for storing map data including a road network.

The mobile device 122 may generate a routing instruction based on the vehicle database 133. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

Figure 10:
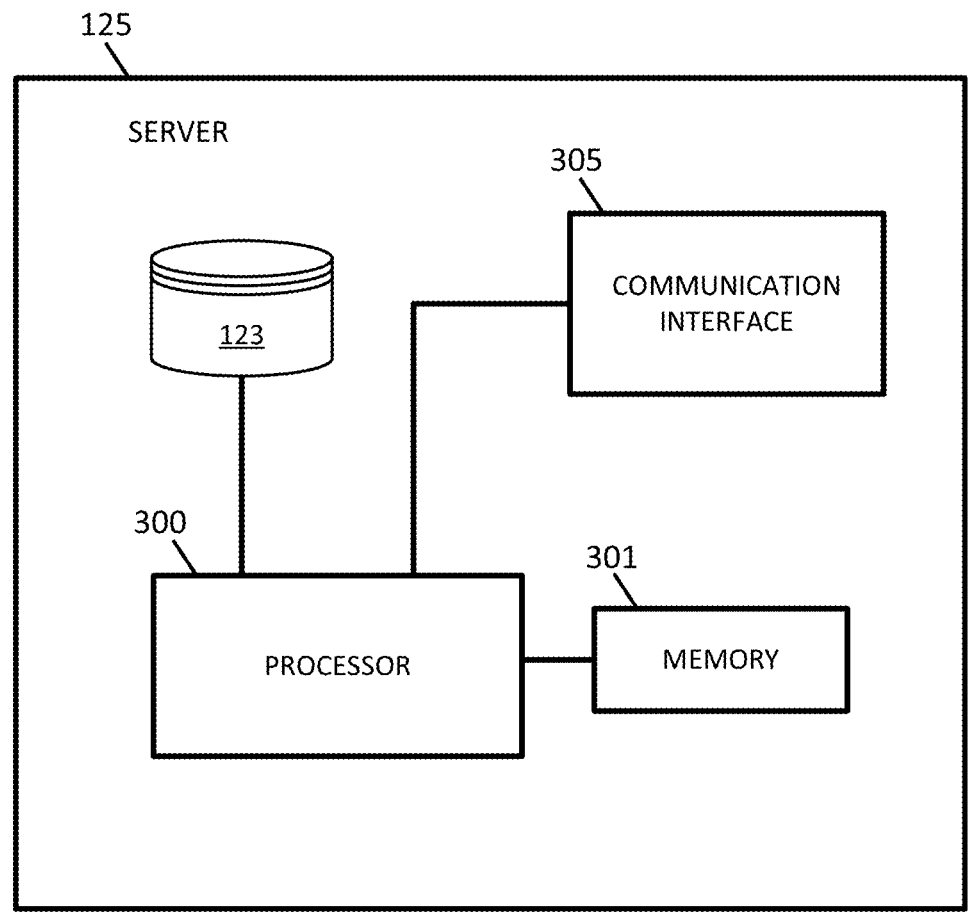
FIG. 10 illustrates an example server.

FIG. 10 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125.

Figure 11:
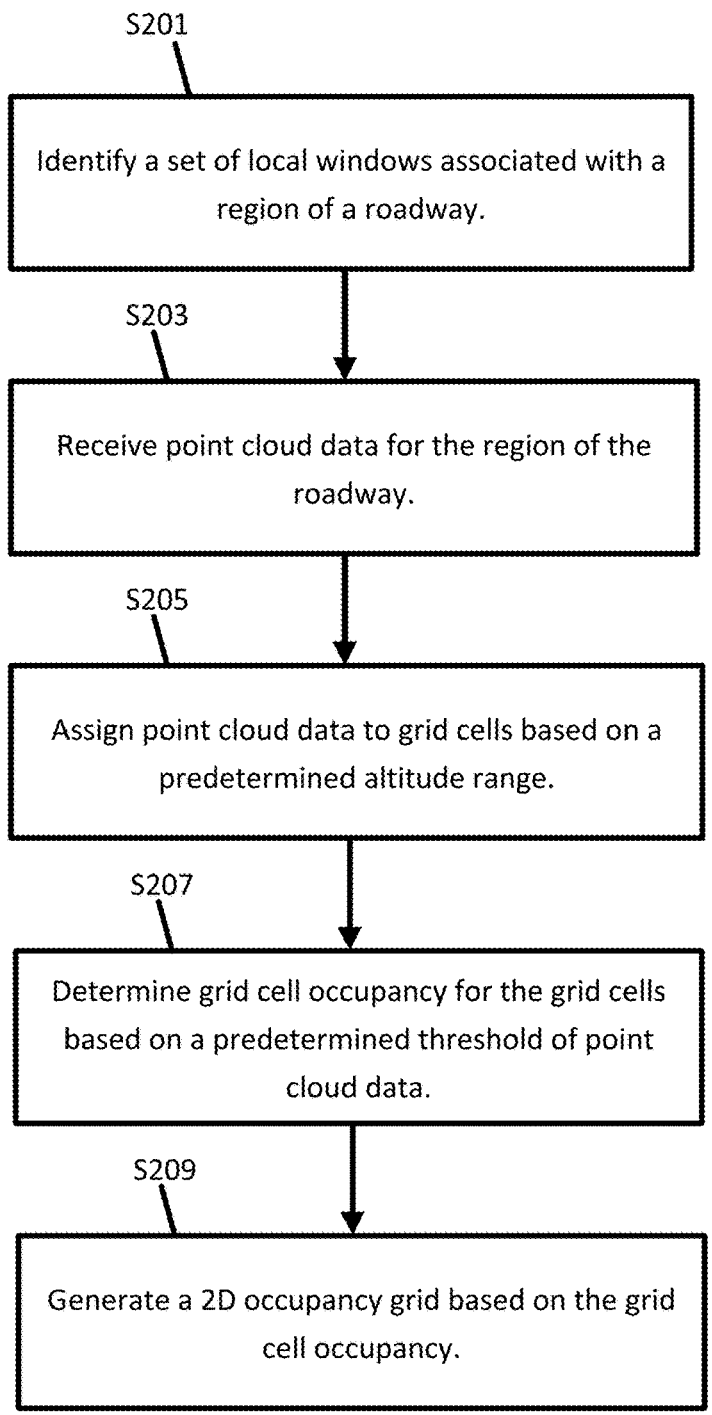
FIG. 11 illustrates an example flowchart for the server of FIG. 10.

FIG. 11 illustrates an example flowchart for the operation of server 125 in generating 2D occupancy grids. Additional, different, or fewer acts may be provided.

At act S201, the processor 300 identifies a set of local windows 132 associated with the region of a roadway 131. The local windows 134 may include a plurality of grid cells 141. The processor 300 may include circuitry or a module or an application specific controller as a means for identifying the set of local windows 132. Each local window 134 of the set of local windows 132 may be sized to provide coverage for the region of the roadway 131. The processor 300 may include circuitry or a module or an application specific controller as a means for determining the size of each local window 134. The local windows 134 may be sized such that the local windows 134 overlap, thus leaving no gaps of road coverage within the set of local windows 132. The local windows 134 may have the same, different, or adaptive window sizes.

At act S203, the processor 300 or communication interface 305 receives point cloud data 140 for the region of the roadway 131. The point cloud data 140 may be generated by the mobile device 122 or the optical distance system such as LiDAR 116 and the image capture system 115 such as a camera of the vehicle 124. The point cloud data 140 may include latitude, longitude, and altitude values. The communication interface 305 may be means for receiving the point cloud data 140. The processor 300 may include circuitry or a module or an application specific controller as a means for receiving the point cloud data 140 for the region of the roadway 131. The point cloud data 140 may be divided into longitudinal sections along the length of the region of the roadway 131. The point cloud data 140 may be analyzed in these sections such that certain portions of the point cloud data 140 corresponds to one of the longitudinal sections.

At act S205, the processor 300 assigns point cloud data 140 to corresponding grid cells 141 within the set of local windows 132 based on a predetermined altitude range 149. The processor 300 may include circuitry or a module or an application specific controller as a means for assigning the point cloud data 140 to grid cells 141 based on an altitude or height range 149. In some examples, the point cloud data 140 may be reduced to exclude any data points corresponding to a road surface at the region of the roadway 131. The processor 300 may extract data points of the point cloud data 140 of each of the grid cells 141 of the 2D occupancy grid having a height or altitude value that does not fall within a predetermined height or altitude range above either the road surface or the vehicle 230 at the region of the roadway 131 (e.g., 3m above the vehicle). The predetermined height or altitude range may be defined according to an upper height or altitude range limit and a lower height or altitude range limit such that the point cloud data points 140 are filtered to remove data between the upper and lower height or altitude range limits. The point cloud data points 140 may also be filtered to remove data points at or above an altitude or clearance height of a structure built above the road surface.

At act S207, the processor 300 determines a grid cell occupancy for the grid cells 141 within the set of local windows 132 based on a predetermined threshold number of point cloud data points 140 assigned to corresponding grid cells 141 that were not extracted in act S205. The processor 300 may include circuitry or a module or an application specific controller as a means for determining grid cell occupancy for the grid cells 141. The processor 300 may determine whether each grid cell of the set of local windows 132 is occupied or unoccupied. The grid cell occupancy indicates whether the portion of the three-dimensional space represented by the grid cell 141 contains data for an object at the portion of the three-dimensional space. The processor 300 may determine a number of point cloud data points 140 assigned to a corresponding grid cell 141 and then determine that a grid cell is occupied when the number of point cloud data points 140 assigned to the corresponding grid cell 141 is above the predetermined threshold or determine that a grid cell is unoccupied when the number of point cloud data points 140 assigned to the corresponding grid cell 141 is below the predetermined threshold. The processor 300 defines, for each grid cell 141 of each row of grid cells 142, a determined grid cell occupancy.

At act S209, the processor 300 generates, for each window 134 of the set of local windows 132 based on the determined grid cell occupancy in act S207, a 2D occupancy grid 145 that acts as a signature for the location along the region of the roadway 131. The processor 300 may include circuitry or a module or an application specific controller as a means for generating the 2D occupancy grid 145. The processor 300 may generate or encode the 2D occupancy grid 145 as a 2D binary occupancy image 150. The processor 300 may define that each grid cell 141 within the 2D occupancy grid 145 contains two possible values, where a first value of the two possible values indicates the grid cell 141 is occupied 143, and where a second value of the two possible values indicates the grid cell 141 is unoccupied 144. The 2D occupancy grid 145 and/or the 2D binary occupancy image 150 may be stored in the memory 301 or database 123. The processor 300 may also compress the 2D binary occupancy image 150 to further reduce the amount of computing and networking resources required to communicate and store the 2D binary occupancy image 150. As discussed above, the server 125 may provide the compressed 2D binary occupancy image 150 to content providers, such as a map developer 121 or an applications developer, to include the 2D binary occupancy image 150 in detailed maps of locations or applications, such as mobile applications, using location related information. The 2D binary occupancy image 150 may also be provided to end users, such as other mobile devices 122 or vehicles 124, in order to perform localization techniques. The 2D binary occupancy image 150 may be provided to other various services or providers as well, such as navigational services or traffic server providers.

Figure 12:
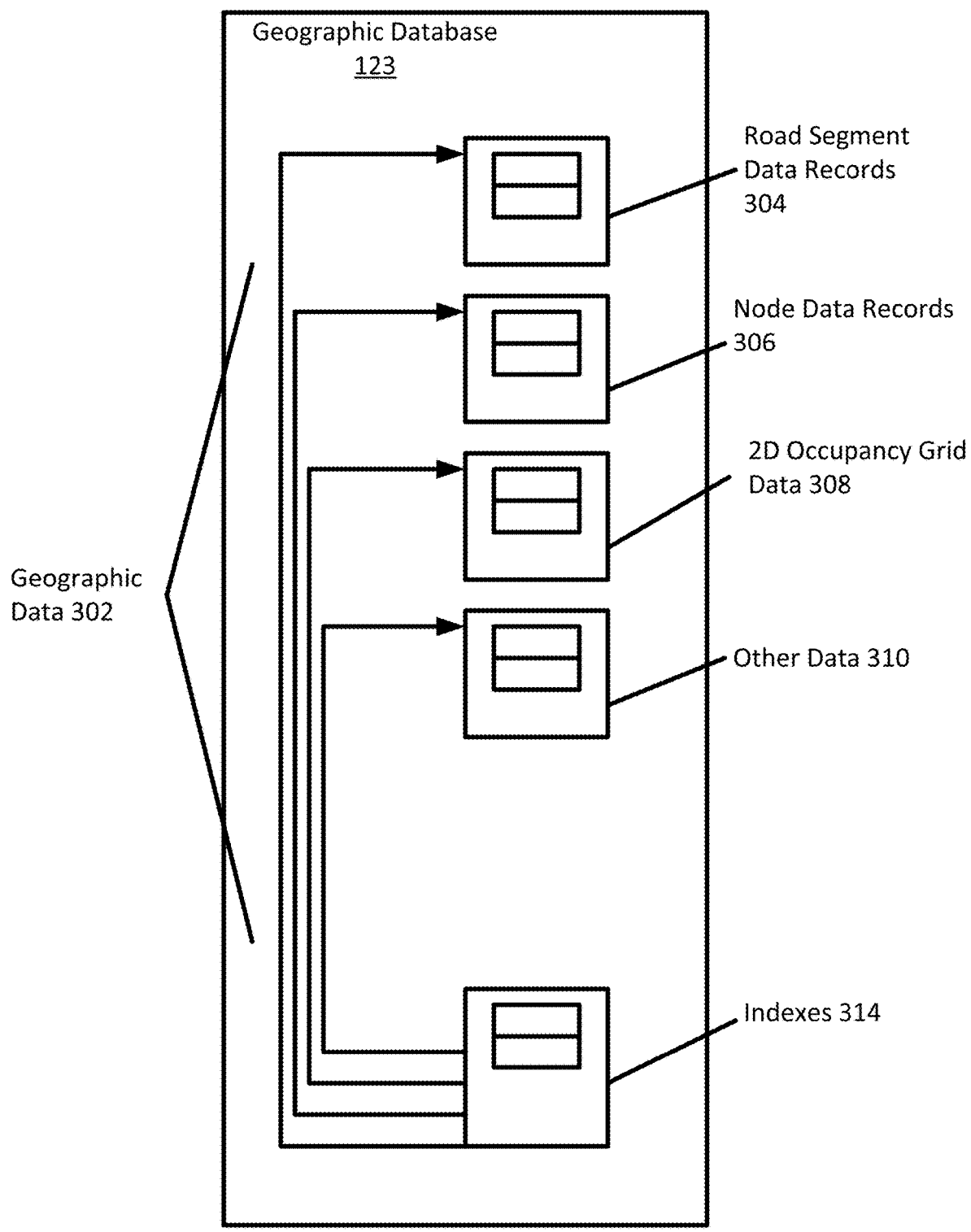
FIGS. 12 and 13 illustrate example geographic databases.

In FIG. 12, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include 2D occupancy grid and/or 2D binary occupancy image data or other types of location fingerprint data for specific locations in a particular geographic region. The road segments, nodes, and other features in the database 123 may be stored according to the segmented path coordinate system (SPCS) such that each feature includes at least one location defined by a distance along the path, a transverse distance from the path, and a height above the path.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate 2D occupancy grid data 308 describing the location of one or more objects in proximity to a road segment in the segment data records 304 or a geographic coordinate. An index 314 may, for example, store 2D occupancy grid data 308 relating to one or more locations. The 2D occupancy grid data 308 for the objects may include a format for SPCS including a distance along the path, a transverse distance from the path, and a height above the path.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, physical structures built on top of or around the road (e.g., bridges, overpasses, tunnels, buildings, parking lots, plazas or parks, monuments, railroad tracks, etc.), and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 13:
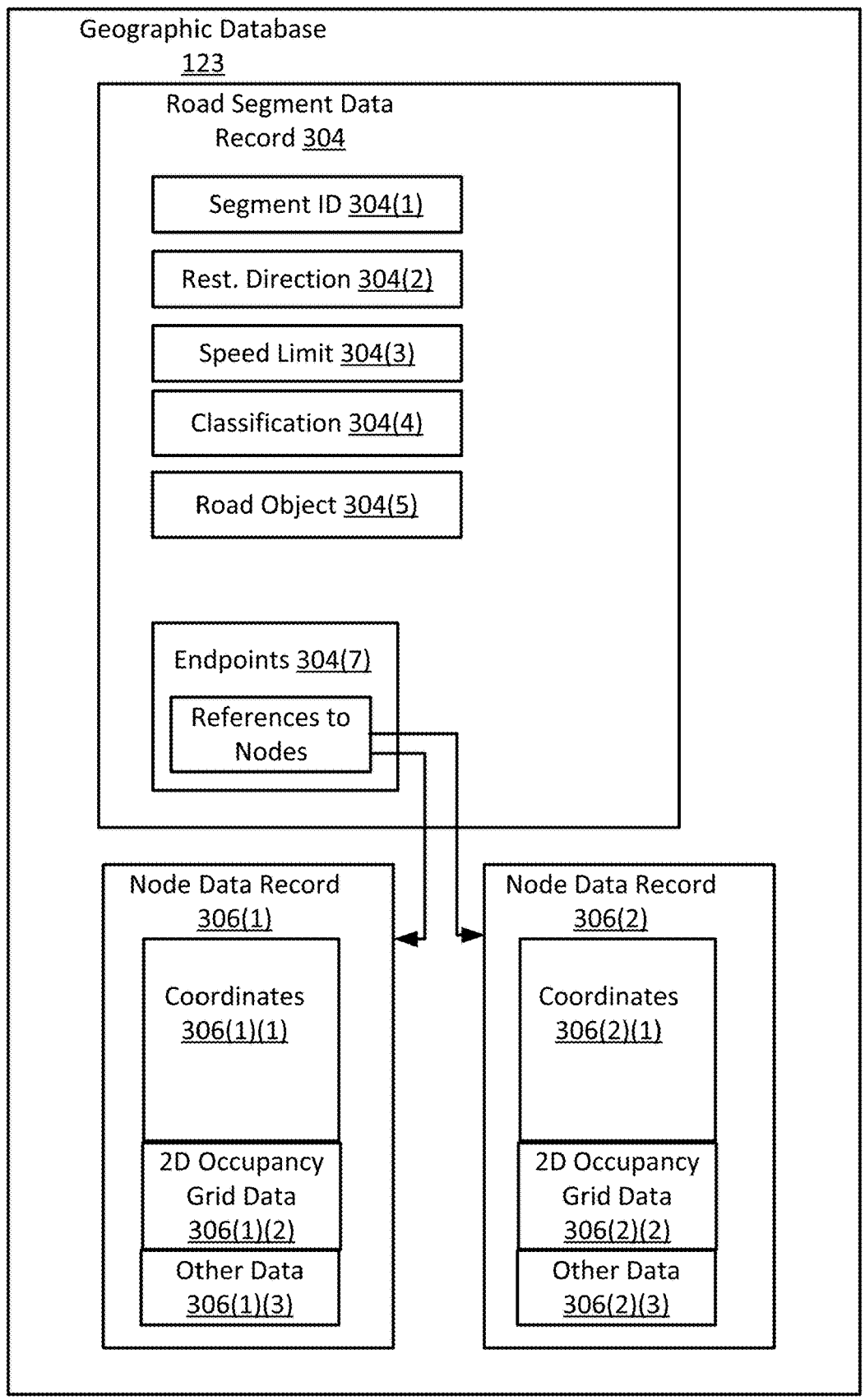

FIG. 13 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include 2D occupancy grid data or other types of location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a 2D occupancy grid or other types of location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. In another embodiment, the data 304(7) provides SPCE coordinates for the road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 13 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and 2D occupancy grid data 306(1)(2) and 306(2)(2), which may include boundaries, dimensions, or other identifiers of the 2D occupancy grids. The 2D occupancy grid data 306 (1)(2) and 306(2)(2) may change dynamically or over time. The node data records 306(1) and 306(2) may also include other data 306(1)(3) and 306(2)(3) that refer to various other attributes of the nodes. The 2D occupancy grid data 306(1)(2) and 306(2)(2) may be used for map matching with location data from a vehicle.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used The geographic database 123 and the data stored within the geographic database 123 may be licensed or delivered on-demand. Other navigational services or traffic server providers may access the 2D occupancy grid data or other types of location fingerprint data, traffic data and/or the lane line object data stored in the geographic database 123.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, turn by turn navigation instructions, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The memory 301 may be configured to store the 2D occupancy grid 145 and/or the 2D binary occupancy image 150 for the local windows 134 arranged in an order that spans multiple local windows 134. That is, 2D occupancy grids 145 and/or 2D binary occupancy images 150 may be stored for the entire set of local windows 132 associated to a region of roadway 131. Thus, memory 301 is a means for storing the 2D occupancy grids 145 and/or the 2D binary occupancy images 150 in a particular order dependent on the number of local windows 134 and the length of the region of roadway 131.

The communication interface 305 may send the 2D occupancy grid 145 and/or the 2D binary occupancy image 150 to the mobile device 122 or vehicle 124 in response to receiving location data from the mobile device 122. The processor 300 may query the geographic database 123 with the location data to select the localization geometry, which may include a 2D occupancy grid 145 and/or a 2D binary occupancy image 150.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for generating a local window-based two-dimensional (2D) occupancy grid that provides a signature for a location along a region of a roadway, the method comprising:
 identifying, by a processor, a set of local windows associated with the region of a roadway, the local windows comprising a plurality of grid cells;
 receiving, by the processor, point cloud data for the region of the roadway;
 assigning, by the processor, the point cloud data to corresponding grid cells within the set of local windows based on a predetermined altitude range;
 determining, by the processor, a grid cell occupancy for the grid cells within the set of local windows based on a predetermined threshold of point cloud data assigned to corresponding grid cells; and
 generating, by the processor, a 2D occupancy grid as the signature for the location along the region of the roadway, the 2D occupancy grid being generated for a window of the set of local windows based on the determined grid cell occupancy for the grid cells within the window.

Embodiment 2

The method of embodiment 1, wherein identifying the set of local windows comprises:
 identifying a maximum separation distance between center points of adjacent local windows, wherein the center points are points equally spaced along a center-line of the region of the roadway based on the maximum separation distance;
 determining a size and a resolution of the adjacent local windows;
 calculating, based on the size of the adjacent local windows, a minimum number of local windows that cover the region of the roadway; and
 defining the local windows that cover the region of the roadway as the set of local windows.

Embodiment 3

The method of embodiment 1 or 2, wherein the set of local windows cover the region of the roadway such that gaps are not present between the local windows.

Embodiment 4

The method of any of embodiments 1 to 3, wherein a size of the local windows of the set of local windows are the same.

Embodiment 5

The method of any of embodiments 1 to 4, wherein assigning the point cloud data comprises:
 excluding point cloud data associated with a road surface at the region of the roadway; and
 assigning a portion of the point cloud data associated with a side of the road surface at the region of the roadway.

Embodiment 6

The method of any of embodiments 1 to 5, wherein the point cloud data comprises latitude, longitude, and altitude values, and wherein point cloud data is only assigned to a corresponding grid cell when the point cloud data for the corresponding grid cell contains altitude values within the predetermined altitude range.

Embodiment 7

The method of any of embodiments 1 to 6, wherein the predetermined altitude range is less than a clearance height of a structure built above a road surface at the region of the roadway.

Embodiment 8

The method of any of embodiments 1 to 7, wherein the 2D occupancy grid comprises a plurality of grid cells representing a three-dimensional space, wherein a grid cell of the plurality of grid cells represents a portion of the three-dimensional space and includes data indicative of the grid cell occupancy, wherein the grid cell occupancy indicates whether the portion of the three-dimensional space represented by the grid cell contains data for an object at the portion of the three-dimensional space.

Embodiment 9

The method of any of embodiments 1 to 8, wherein determining the grid cell occupancy comprises:
determining a number of point cloud data points assigned to a corresponding grid cell; and
determining whether the corresponding grid cell is occupied or unoccupied, wherein, when the number of point cloud data points assigned to the corresponding grid cell is above the predetermined threshold, the grid cell is occupied, and wherein, when the number of point cloud data points assigned to the corresponding grid cell is below the predetermined threshold, the grid cell is unoccupied.

Embodiment 10

The method of any of embodiments 1 to 9, further comprising encoding the 2D occupancy grid as a 2D binary occupancy image, wherein a grid cell contains two possible values.

Embodiment 11

The method of any of embodiments 1 to 10, wherein a first value of the two possible values indicates the grid cell is occupied, and wherein a second value of the two possible values indicates the grid cell is unoccupied.

Embodiment 12

An apparatus, configured to perform and/or control the method of any of embodiments 1-11 or comprising means for performing and/or controlling any of embodiments 1-11.

Embodiment 13

An apparatus, comprising at least one processor and at least one memory including computer program code for one or more programs, the at least one memory and the computer program code configured to, with the at least one processor, to perform and/or control the method of any of embodiments 1-11.

Embodiment 14

A computer program comprising instructions operable to cause a processor to perform and/or control the method of any of embodiments 1-11, when the computer program is executed on the processor.

We claim:

1. A method for generating a local window-based two-dimensional (2D) occupancy grid that provides a signature for a location along a region of a roadway, the method comprising:
identifying, by a processor, a set of local windows associated with the region of a roadway, the local windows comprising a plurality of grid cells;
receiving, by the processor, point cloud data for the region of the roadway;
assigning, by the processor, the point cloud data to corresponding grid cells within the set of local windows based on a predetermined altitude range;
determining, by the processor, a grid cell occupancy for the grid cells within the set of local windows based on a predetermined threshold of point cloud data assigned to corresponding grid cells; and
generating, by the processor, a 2D occupancy grid for a window of the set of local windows based on the determined grid cell occupancy for the grid cells within the window, the window of the set of local windows being associated with the location along the region of the roadway, such that the 2D occupancy grid acts as the signature for the location along the region of the roadway.

2. The method of claim 1, wherein identifying the set of local windows comprises:
identifying a maximum separation distance between center points of adjacent local windows, wherein the center points are points equally spaced along a center-line of the region of the roadway based on the maximum separation distance;
determining a size and a resolution of the adjacent local windows;
calculating, based on the size of the adjacent local windows, a minimum number of local windows that cover the region of the roadway; and
defining the local windows that cover the region of the roadway as the set of local windows.

3. The method of claim 1, wherein the set of local windows cover the region of the roadway such that gaps are not present between the local windows.

4. The method of claim 1, wherein a size of the local windows of the set of local windows are the same.

5. The method of claim 1, wherein assigning the point cloud data comprises:
excluding point cloud data associated with a road surface at the region of the roadway; and
assigning a portion of the point cloud data associated with a side of the road surface at the region of the roadway.

6. The method of claim 1, wherein the point cloud data comprises latitude, longitude, and altitude values, and wherein point cloud data is only assigned to a corresponding grid cell when the point cloud data for the corresponding grid cell contains altitude values within the predetermined altitude range.

7. The method of claim 1, wherein the predetermined altitude range is less than a clearance height of a structure built above a road surface at the region of the roadway.

8. The method of claim 1, wherein the 2D occupancy grid comprises a plurality of grid cells representing a three-dimensional space, wherein a grid cell of the plurality of grid cells represents a portion of the three-dimensional space and includes data indicative of the grid cell occupancy, wherein the grid cell occupancy indicates whether the portion of the three-dimensional space represented by the grid cell contains data for an object at the portion of the three-dimensional space.

9. The method of claim 1, wherein determining the grid cell occupancy comprises:
   determining a number of point cloud data points assigned to a corresponding grid cell; and
   determining whether the corresponding grid cell is occupied or unoccupied, wherein, when the number of point cloud data points assigned to the corresponding grid cell is above the predetermined threshold, the grid cell is occupied, and wherein, when the number of point cloud data points assigned to the corresponding grid cell is below the predetermined threshold, the grid cell is unoccupied.

10. The method of claim 1, further comprising encoding the 2D occupancy grid as a 2D binary occupancy image, wherein a grid cell contains two possible values.

11. The method of claim 10, wherein a first value of the two possible values indicates the grid cell is occupied, and wherein a second value of the two possible values indicates the grid cell is unoccupied.

12. An apparatus for generating a local window-based two-dimensional (2D) occupancy grid that provides a signature for a location along a region of a roadway, the apparatus comprising:
   a communication interface configured to receive point cloud data associated with the region of a roadway; and
   a controller configured to identify a set of local windows associated with the region of a roadway, the local windows comprising a plurality of grid cells, assign the point cloud data to corresponding grid cells within the set of local windows based on a predetermined altitude range, determine a grid cell occupancy for the grid cells within the set of local windows based on a predetermined threshold of point cloud data assigned to corresponding grid cells, and generate a 2D occupancy grid for a window of the set of local windows based on the determined grid cell occupancy for the grid cells within the window, the window of the set of local windows being associated with the location along the region of the roadway, such that the 2D occupancy grid acts as the signature for the location along the region of the roadway.

13. The apparatus of claim 12, wherein the controller, to identify a set of local windows associated with the region of the roadway, is configured to:
   identify a maximum separation distance between center points of adjacent local windows, wherein the center points are points equally spaced along a center-line of the region of the roadway based on the maximum separation distance;
   determine a size and a resolution of the adjacent local windows;
   calculate, based on the size of the adjacent local windows, a minimum number of local windows that cover the region of the roadway; and
   define the local windows that cover the region of the roadway as the set of local windows.

14. The apparatus of claim 12, wherein the set of local windows cover the region of the roadway such that gaps are not present between the local windows.

15. The apparatus of claim 12, wherein the predetermined altitude range is less than an altitude of a structure built above a road surface at the region of the roadway.

16. The apparatus of claim 12, wherein the controller, to determine the grid cell occupancy, is configured to determine a number of point cloud data points assigned to a corresponding grid cell and determine whether the corresponding grid cell is occupied or unoccupied, wherein, when the number of point cloud data points assigned to the corresponding grid cell is above the predetermined threshold, the grid cell is occupied, and wherein, when the number of point cloud data points assigned to the corresponding grid cell is below the predetermined threshold, the grid cell is unoccupied.

17. The apparatus of claim 12, wherein the controller is further configured to encode the 2D occupancy grid as a 2D binary occupancy image, wherein a grid cell contains two possible values, the two possible values being a first value indicative of an occupied grid cell and a second value indicative of an unoccupied grid cell.

18. A non-transitory computer-readable medium encoded with instructions that, when executed by a processor, perform:
   identifying, based on a location of a user at a region of a roadway, a local window associated with the region of the roadway;
   accessing a 2D occupancy grid associated with the local window, wherein the 2D occupancy grid represents roadside objects at the region of the roadway, wherein the 2D occupancy grid is generated based on a predetermined threshold of point cloud data assigned to corresponding grid cells within the 2D occupancy grid, and wherein the 2D occupancy grid is generated by determining a number of point cloud data points assigned to a corresponding grid cell and determining whether the corresponding grid cell is occupied or unoccupied, wherein, when the number of point cloud data points assigned to the corresponding grid cell is above the predetermined threshold, the grid cell is occupied, and wherein, when the number of point cloud data points assigned to the corresponding grid cell is below the predetermined threshold, the grid cell is unoccupied;
   receiving sensor data from the user located at the region of the roadway;
   comparing the 2D occupancy grid and the received sensor data; and
   performing localization of the user located at the region of the roadway based on the comparison.

19. The non-transitory computer-readable medium of claim 18, wherein the grid cells of the 2D occupancy grid represent a three-dimensional space having a predetermined altitude range, the predetermined altitude range being less than an altitude of a structure built above a road surface at the region of the roadway.

* * * * *